(12) United States Patent
Lamping et al.

(10) Patent No.: US 8,519,869 B2
(45) Date of Patent: *Aug. 27, 2013

(54) AIRCRAFT TIRE PRESSURE LOOP LINK

(75) Inventors: Jeff Lamping, Snohomish, WA (US);
Igal Goniodsky, Kirkland, WA (US)

(73) Assignee: ELDEC Corporation, Lynwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,616

(22) Filed: Mar. 30, 2012

(65) Prior Publication Data

US 2012/0206278 A1 Aug. 16, 2012

Related U.S. Application Data

(63) Continuation-in-part of application No. 13/289,555, filed on Nov. 4, 2011, now Pat. No. 8,305,237, which is a continuation of application No. 12/409,432, filed on Mar. 23, 2009, now Pat. No. 8,059,014.

(60) Provisional application No. 61/038,556, filed on Mar. 21, 2008.

(51) Int. Cl.
*G08B 21/00* (2006.01)

(52) U.S. Cl.
USPC .................. 340/945; 340/425.5; 340/568.1

(58) Field of Classification Search
USPC ........... 340/945, 445, 447, 568.1, 444, 425.5, 340/438, 442, 572.7, 572.1, 443
See application file for complete search history.

(56) References Cited

U.S. PATENT DOCUMENTS

| 4,724,389 | A | * | 2/1988 | Hyde et al. | 324/318 |
|---|---|---|---|---|---|
| 5,231,391 | A | | 7/1993 | Rigaux | |
| 5,853,020 | A | | 12/1998 | Widner | |
| 6,839,035 | B1 | | 1/2005 | Addonisio et al. | |
| 6,889,543 | B2 | | 5/2005 | Gautier | |
| 7,202,778 | B2 | | 4/2007 | Buenz et al. | |
| 8,059,014 | B2 | * | 11/2011 | Lamping et al. | 340/945 |
| 8,305,237 | B2 | * | 11/2012 | Lamping et al. | 340/945 |
| 2002/0190853 | A1 | | 12/2002 | Nigon et al. | |
| 2005/0099283 | A1 | * | 5/2005 | Johnson et al. | 340/447 |
| 2005/0179529 | A1 | | 8/2005 | Sato | |
| 2005/0264406 | A1 | * | 12/2005 | Myhre et al. | 340/445 |

OTHER PUBLICATIONS

International Search Report, May 20, 2009, 2 pages.

* cited by examiner

*Primary Examiner* — Daniel Previl
(74) *Attorney, Agent, or Firm* — Fulwider Patton LLP

(57) ABSTRACT

The aircraft tire pressure loop link is formed of first and second single metal loops connected by parallel spaced apart metal shafts, and provides for coupling a magnetic field between a wheel hub coil and a tire pressure sensor coil to provide electromagnetic communication between a control unit connect to the wheel hub coil and a tire pressure sensor connected to the tire pressure sensor coil. The current induced in the first single metal loop travels the distance from the edge of the wheel axle coil to the periphery of the of the wheel rim to the second single metal loop, which generates the flux in the tire pressure sensor receiver coil necessary to power the tire pressure sensor.

19 Claims, 16 Drawing Sheets

AIRCRAFT TIRE PRESSURE LOOP LINK

CROSS-REFERENCES TO RELATED APPLICATIONS

This application is a continuation-in-part of application Ser. No. 13/289,555, filed Nov. 4, 2011, now U.S. Pat. No. 8,305,237, which is a continuation of application Ser. No. 12/409,432 filed Mar. 23, 2009, now U.S. Pat. No. 8,059,014, which claims priority to and is based upon Provisional Application No. 61/038,556, filed Mar. 21, 2008, each of which is incorporated by reference herein.

BACKGROUND

This invention relates generally to vehicle tire pressure control systems, and more particularly relates to a system for transmitting power to an aircraft tire pressure sensor from a control unit associated with a wheel hub and transmitting data between the aircraft tire pressure sensor and the control unit. The invention pertains more specifically to a communication link between a tire pressure sensor on a wheel rim and control electronics connected to a wheel hub, particularly for aircraft.

It is useful in an airplane to measure the pressure of each tire and display this information in the cockpit. It is necessary to communicate this information from the wheel rim to the hub, from the wheel hub to the electronics located on the wheel axle, and then from the electronics unit to the cockpit.

One known tire pressure system uses a pair of transformer coils to communicate between a primary and secondary coil in the wheel axle. These transformers are coaxial and face each other. A length of wire connected to the secondary of the transformer pair connects directly with the tire pressure sensor that is located on the periphery of the wheel rim. Another known device for enhancing the magnetic coupling in a RFID wireless communication system includes first and second antenna coils connected together by electrical connectors in a closed loop and formed on a flexible substrate that can be folded around a magnetic flux blocker to avoid magnetic interference from the magnetic flux blocker. However, it is desirable to provide communication between an airplane wheel hub and a tire pressure sensor located on the rim of the wheel up to six inches away from the wheel hub without using electrical connections that can be unreliable and easily be broken in a harsh airplane wheel environment. It is thus desirable to provide a non-contact method of communication between an airplane wheel hub and a tire pressure sensor located on the rim of the wheel that does not require electrical connections or a length of wire to communicate between the wheel hub and the tire pressure sensor.

A magnetically coupled antenna range extender is also known that is structured to be interposed between an RF antenna and an electronic device from 0.5 to 5 centimeters from the RF antenna or the electronic device, for extending the operating range of communication between the RF antenna and the electronic device. The antenna range extender includes a passive series tuned resonate circuit that must be tuned to resonate substantially at the frequency of an RF signal radiated by the RF antenna. The passive series tuned resonate circuit can be formed by an open loop coil of an electrical conductor, with a capacitor connected in series and completing the circuit. However, it has been found that an electromotive force can be induced in such a loop by stray magnetic flux that can generate an electric current that can interfere with a desired signal being conducted.

A need therefore remains to reduce the cost of the device that links the two coils, and to reduce the complexity of the device that links the magnetic field, in a manner that avoids the generation of signal interference, the use of unreliable electrical connections, and the use wires for electrical connections, which can easily break in the harsh environment of the airplane wheel. The present invention fills this and other needs.

SUMMARY OF THE INVENTION

Briefly and in general terms, the invention provides for an aircraft tire pressure loop link for electromagnetically coupling a magnetic field between a wheel hub coil and a tire pressure sensor coil that does not use unreliable electrical connections and does not use wires that are otherwise prone to breaking in the harsh environment of the airplane wheel.

Accordingly, in a first embodiment, the present invention provides for an aircraft tire pressure loop link that can be formed as a rigid first or primary single metal loop connected by a rigid pair of spaced apart electrically conductive connecting arms with a rigid second or secondary single metal loop, with the first or primary single metal loop being configured to be mounted adjacent to a wheel axle electromagnetic transceiver drive coil, and the second single metal loop being configured to be mounted adjacent to a tire pressure sensor transceiver coil. The current induced in the first single metal loop travels the distance from the edge of the wheel axle coil to the periphery of the wheel rim to the second single metal loop, which generates the flux in the tire pressure sensor receiver coil necessary to power the tire pressure sensor.

The pair of spaced apart electrically conductive connecting arms is typically formed from first and second single metal loops and connecting parallel spaced apart metal shafts that can be made from a metal, such as aluminum or titanium, for example, that need not be a permeable metal, to couple flux over the needed distance. In order to collect, concentrate and direct an impinging magnetic flux from the wheel axle electromagnetic transceiver coil to the first or primary single metal loop, the first or primary single metal loop advantageously includes a magnetic flux collector insert member electrically connected and attached to the first single metal loop, to collect, concentrate and direct the impinging magnetic flux through an area of a central portion of a cross sectional area enclosed by the first single metal loop. The aircraft tire pressure loop link can be manufactured by stamping and bending, and can be scaled easily to work in smaller or bigger wheel diameters. Electrical connections are not needed between the tire pressure sensor and the wheel hub coil. Hence, the present invention uses a more reliable method to communicate with the tire pressure sensor. The simplicity of the design makes it much easier to produce. The design is also lower cost. The design can also be made strong by using thicker sheet metal so that it can withstand the harsh environment in the airplane wheel. The design is non-contact since the coupling device does not contact the wheel hub coil.

The aircraft tire pressure loop link allows communication to occur through a magnetic field coupling a tire pressure sensor and a wheel axle coil. The aircraft tire pressure loop link allows the coupling of flux over a significant distance without the need to use permeable materials bridging the entire distance, and allows signal coupling to occur without requiring contact with the wheel hub coil in any way.

These and other aspects and advantages of the invention will become apparent from the following detailed description and the accompanying drawings, which illustrate by way of example the features of the invention.

DETAILED DESCRIPTION OF THE PREFERRED EMBODIMENTS

While primary and secondary transformer coils have been used to communicate between a tire sensor and a wheel axle to convey tire pressure information through the wheel axle, with a length of wire connecting the secondary coil directly with the tire pressure sensor, this has proved unreliable in communicating between an airplane wheel hub and a tire pressure sensor located on the rim of the wheel up to six inches away from the wheel hub as is needed, particularly since electrical connections that can be unreliable and easily be broken in a harsh airplane wheel environment.

A tire pressure monitor system was developed in which an electronics unit located in the hub of the wheel communicates with a tire pressure sensor near the rim of the wheel using a magnetic field. A coil centered on the wheel axle and located on the hub of the wheel produces the magnetic field. This magnetic field can be coupled to a tire pressure sensor receiver coil using a length of thin and highly permeable multilayer and laminated metal structure to couple flux from the edge of the wheel hub coil out to the periphery of the wheel rim where the receiver coil of the tire pressure sensor is located. Information can be transferred to and from the tire pressure sensor through this magnetic field coupling the two coils. However, the high permeability of the metal flux link couples a fraction of the total flux out to the length of material and into the tire pressure sensor coil.

Figure 1:
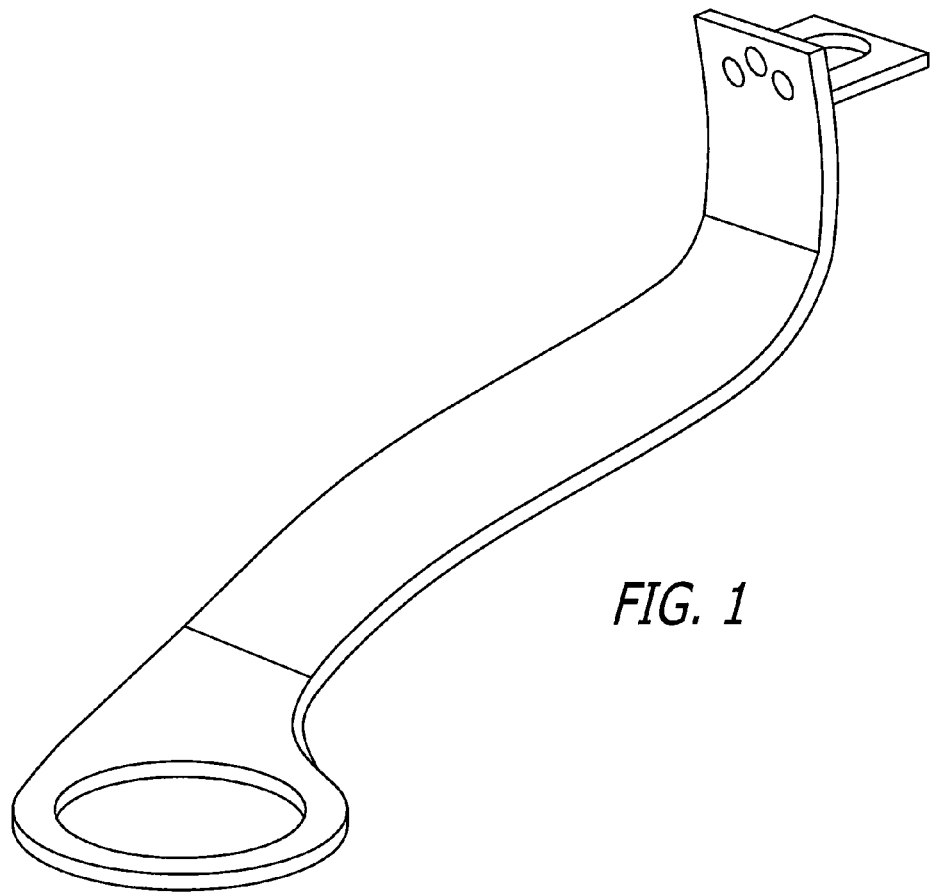
FIG. 1 is a perspective view of a highly permeable multi-layer and laminated metal flux link.
Figure 2A:
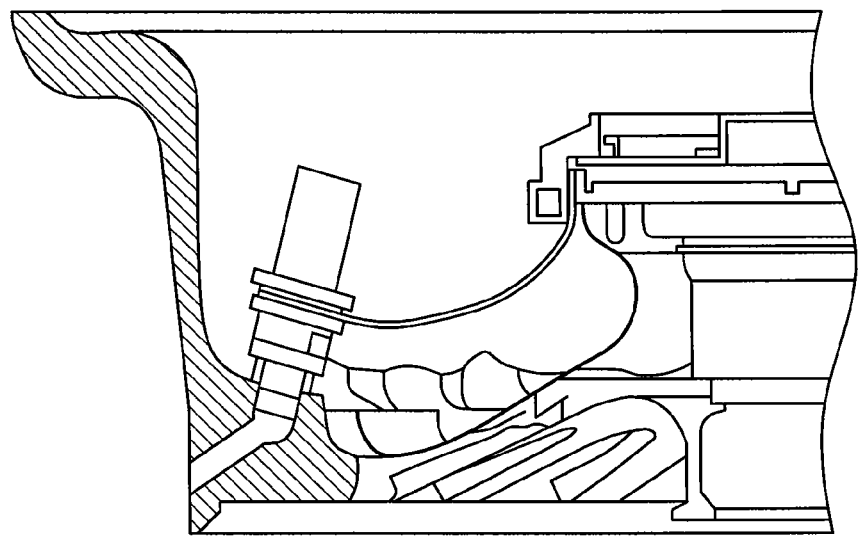
FIG. 2A shows partial views illustrating the mounting of the flux link of FIG. 1 in an aircraft wheel electromagnetically connecting a wheel hub to a tire pressure sensor.
Figure 2B:
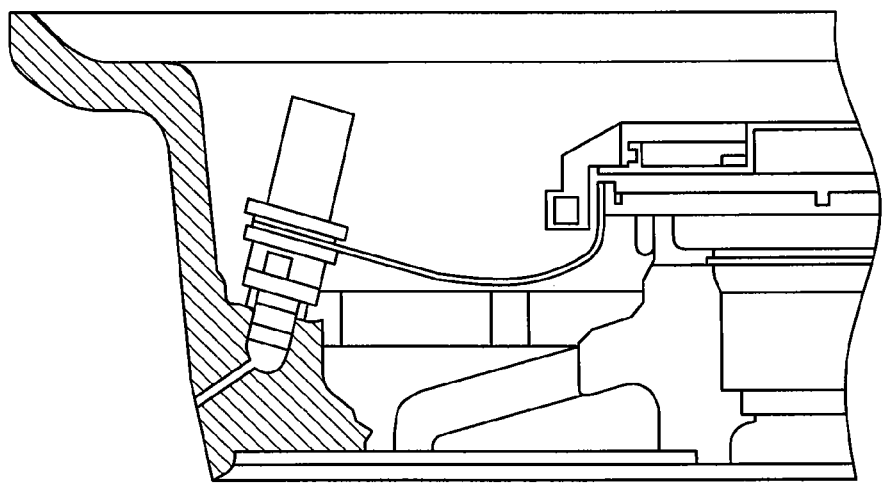
FIG. 2B shows partial views illustrating the mounting of the flux link of FIG. 1 in another aircraft wheel electromagnetically connecting a wheel hub to a tire pressure sensor.

One method of increasing the strength of the magnetic field is to insert a magnetic field coupling device between the edge of the wheel hub coil and the tire pressure sensor coil. One approach to enhance the coupled magnetic field is to collect flux with a highly permeable magnetic metal strip. This strip can be called a flux link, and is shown in FIG. 1. A diagram of the flux link installed in a Messier-Bugatti airplane wheel is shown in FIG. 2A, and a diagram of the flux link installed in a Goodrich airplane wheel is shown in FIG. 2B. The permeable magnetic metal strip couples flux about four inches down the flux link to the tire pressure sensor body. The permeable body of the tire pressure sensor further couples the flux up through the tire pressure sensor receiver coil. Because the frequency of operation is so high (135 KHz), the permeable metal object must be many layers of a very thin (0.004 inch) magnetic material to keep the losses caused by eddy currents low. One implementation of the design required 10 insulated layers of the thin and highly permeable magnetic material. The use of such a large number of layers of such thin and highly permeable magnetic materials results in a high complexity and a high cost to provide sufficient magnetic field strength to allow transfer of information to and from the tire pressure sensor through such a magnetic field coupling.

Accordingly, in a first embodiment, the present invention provides for an improved method and system for coupling a magnetic field between a wheel hub coil and a tire pressure sensor coil that reduces the cost of the device that links the two coils, and reduces the complexity of the device that links the magnetic field, without using unreliable electrical connections and wires that can easily break in the harsh environment of the airplane wheel. An example of the aircraft tire pressure loop link of the invention is illustrated in FIGS. 3-8.

Figure 3:
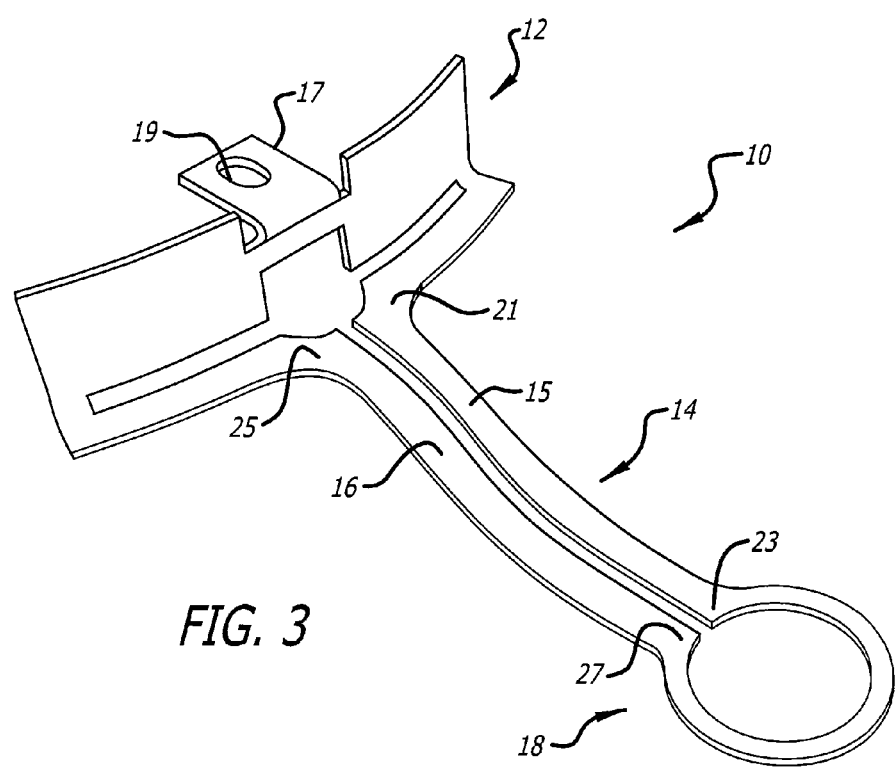
FIG. 3 is a perspective view of a first embodiment of an aircraft tire pressure loop link according to the invention.
Figure 4:
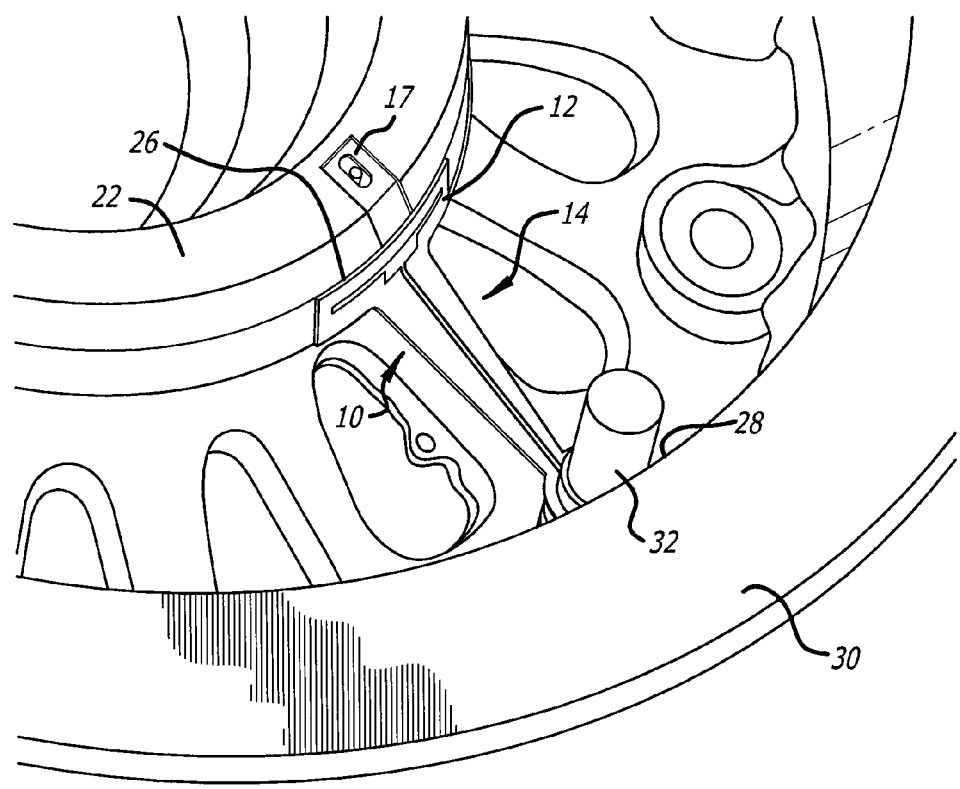
FIG. 4 is a perspective view illustrating the mounting of the aircraft tire pressure loop link of FIG. 3 in an aircraft wheel, electromagnetically connecting a wheel hub to a tire pressure sensor.
Figure 5:
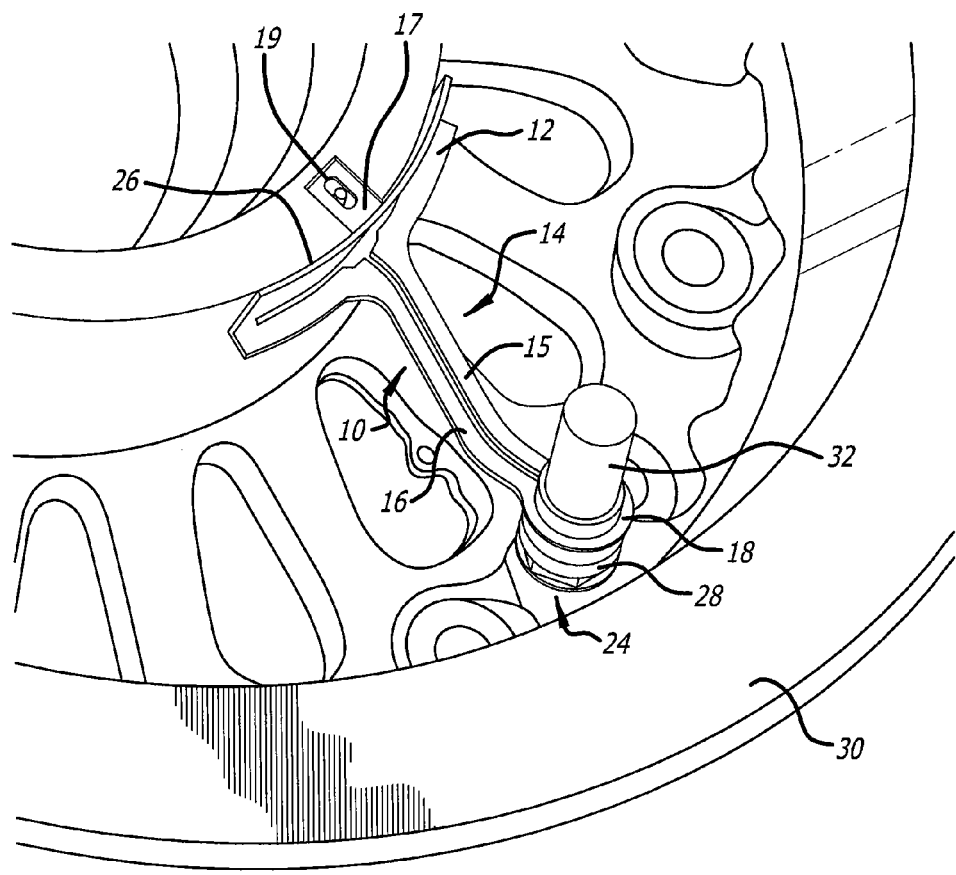
FIG. 5 is another perspective view similar to FIG. 4, illustrating the mounting of the aircraft tire pressure loop link of FIG. 3 in an aircraft wheel, electromagnetically connecting a wheel hub to a tire pressure sensor.
Figure 6:
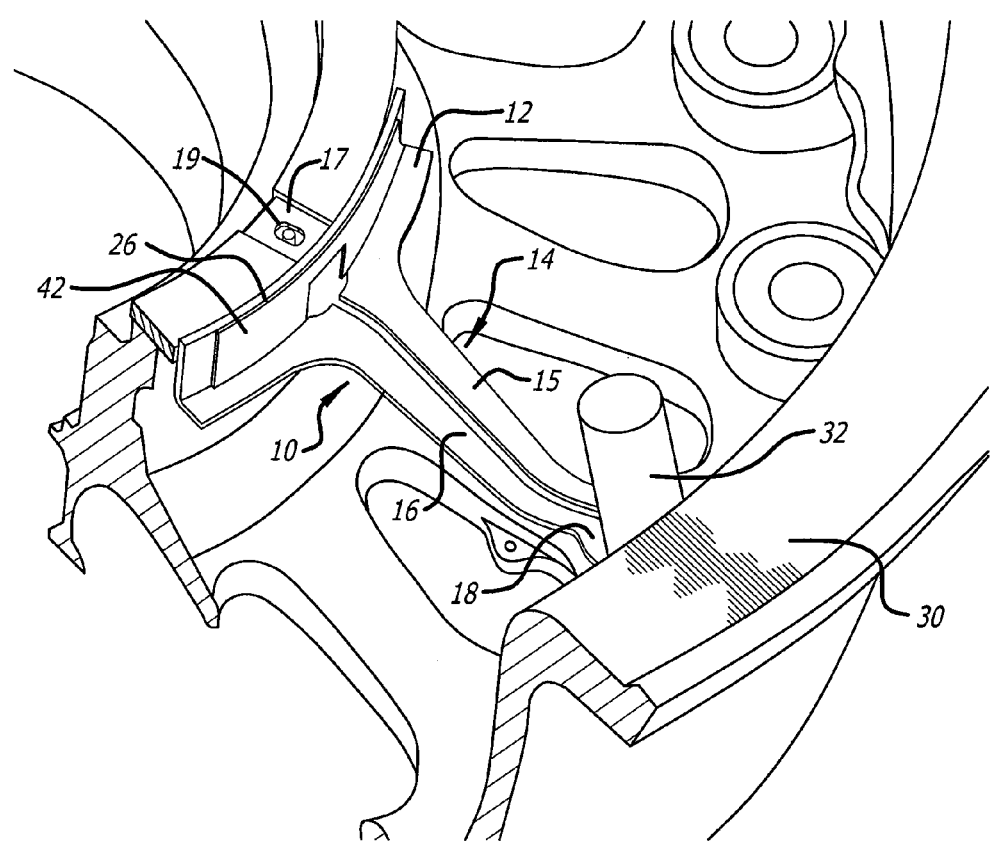
FIG. 6 is another perspective view similar to FIG. 4, illustrating the mounting of the aircraft tire pressure loop link of FIG. 3 in an aircraft wheel, electromagnetically connecting a wheel hub to a tire pressure sensor.

The invention is advantageous in that it does not use a pair of wires to electrically connect an axle wheel coil with a tire pressure sensor receiver coil. Referring to the drawings, in which like elements are denoted by like reference numbers, the aircraft tire pressure loop link 10 of the invention is typically formed as a rigid first or primary single metal loop 12, a rigid pair of spaced apart electrically conductive connecting arms 14, typically including parallel spaced apart metal shafts 15, 16, and a rigid second or secondary single metal loop 18. The parallel spaced apart metal shafts are preferably closely spaced apart by a small gap, to minimize their loop area. The pair of spaced apart electrically conductive connecting arms is rigidly electrically connected between the first or primary single metal loop and the second or secondary single metal loop. As is illustrated in FIG. 3, the shaft 15 of the pair of spaced apart electrically conductive connecting arms is rigidly electrically connected between a first portion 21 of the first or primary single metal loop 12 and a first portion 23 of the second or secondary single metal loop 18, and the shaft 16 is rigidly electrically connected between a second portion 25 of the first or primary single metal loop 12 and a second portion 27 of the second or secondary single metal loop 18. The first or primary single metal loop is configured to be mounted adjacent to an electromagnetic transceiver drive coil 20, illustrated in FIG. 8, of a wheel axle 22, and the second single metal loop is configured to be mounted adjacent to a tire pressure sensor transceiver coil 24. As is illustrated in FIGS. 3-6, the rigid first or primary single metal loop 12 can be attached to the wheel axle 22 by a flange 17 having an aperture 19 for a fastener therethrough. The current induced in the first or primary single metal loop travels the distance from the edge 26 of the wheel axle transceiver drive coil to the periphery 28 of the wheel rim 30 to the second single metal loop, which generates the flux in the tire pressure sensor receiver coil necessary to power a tire pressure sensor 32.

The aircraft tire pressure loop link of the invention can be made from a variety of metallic materials, such as low magnetically permeable metals, including aluminum or titanium, for example, that are readily available, and it is not necessary to use a highly magnetically permeable metal to couple flux over the needed distance. The pair of spaced apart electrically conductive connecting arms can be made of any desirable length without loss of coupling enhancement between a wheel axle electromagnetic transceiver drive coil and a tire pressure sensor transceiver coil. The flux is linked in one turn of a metal loop and the current induced in the loop travels the distance from the edge of the wheel axle coil to the periphery of the of the wheel rim, where the second single loop of metal generates the flux in the tire pressure sensor receiver coil. The aircraft tire pressure loop link of the invention advantageously provides a low impedance electromagnetic signal path connection between a wheel axle electromagnetic transceiver drive coil and a tire pressure sensor transceiver coil, so that no electrical insulation is required over the pair of connecting arms of the loop link. In addition, the aircraft tire pressure loop link of the invention advantageously provides a low voltage electromagnetic signal path connection between the wheel axle electromagnetic transceiver drive coil and the tire pressure sensor transceiver coil, so that the loop link is not a source of electric field radiation and is not sensitive to electric field interference. The aircraft tire pressure loop link of the invention also advantageously can typically be an intrinsically rigid, self-supporting structural part, not requiring any additional means of support.

Figure 7:
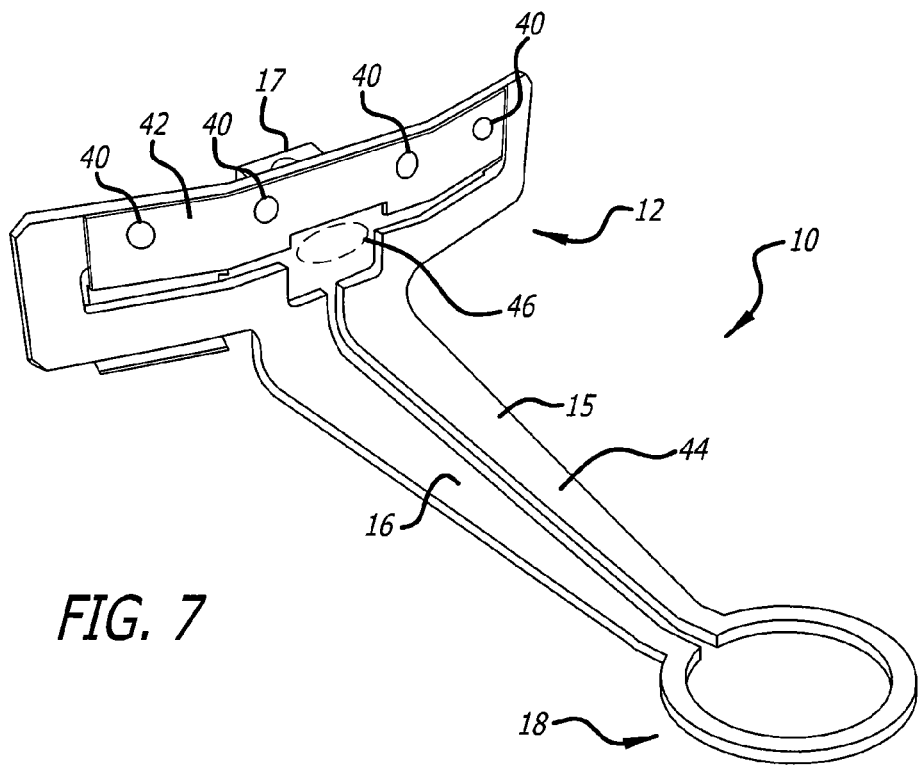
FIG. 7 is a front perspective view of the aircraft tire pressure loop link of FIG. 3 according to the invention.

FIG. 7 shows another view of the loop link of the present invention, illustrating electrical connection and attachment of a highly permeable magnetic flux collector insert member 42, such as by aluminum rivets 40, for example. Item 44 is a piece of aluminum sheet metal bent into shape. The magnetic flux collector insert member 42 provides a means of collecting an impinging magnetic flux from the wheel axle electromagnetic transceiver drive coil, and then concentrating and directing that magnetic flux through an area 46 of a central portion of the cross sectional area enclosed by the upper first or primary single metal loop 12. This greatly enhances the coupling efficiency of the loop link of the invention, by allowing a greater portion of the flux from the wheel axle electromagnetic transceiver drive coil to pass through the first or primary single metal loop as if the first or primary single metal loop were physically much larger. The magnetic flux collector insert member 42 is typically formed of a highly permeable magnetic metal, such as a nickel-iron-molybdenum alloy sold under the trademark HYMU-80, or a nickel-iron magnetic alloy sold under the trademark PERMALLOY.

Figure 8:
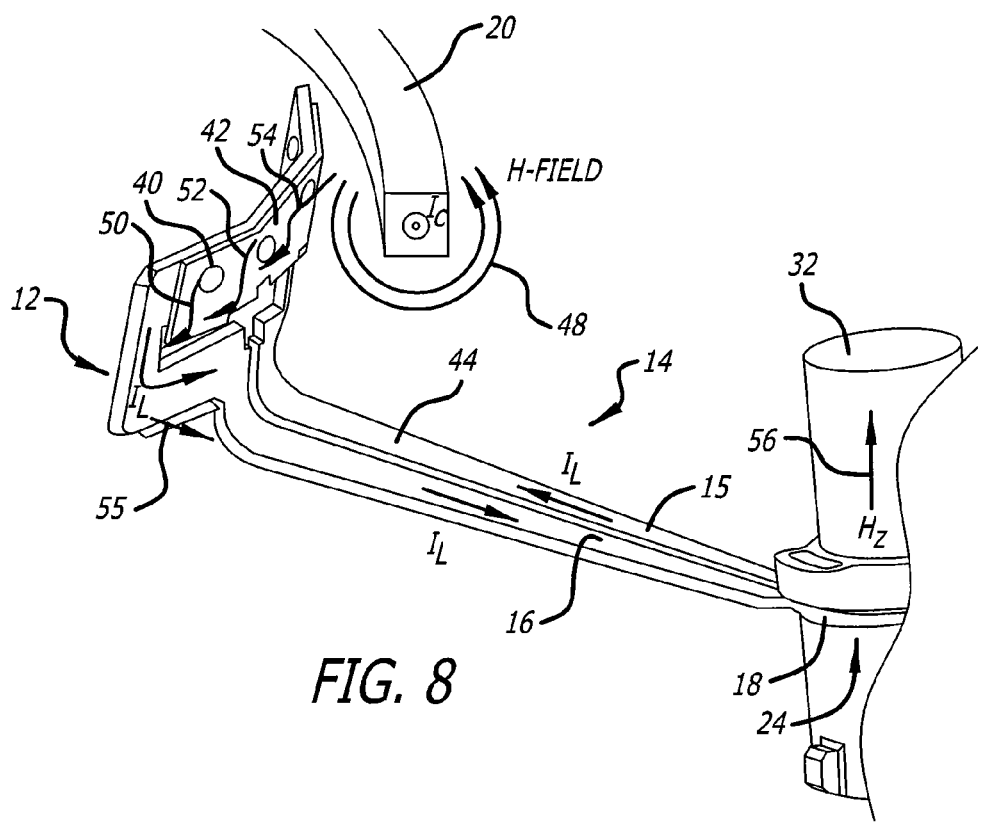
FIG. 8 is a functional, schematic diagram of the aircraft tire pressure loop link of FIG. 3 mounted in an aircraft wheel, illustrating the principles of operation of the aircraft tire pressure loop link.

FIG. 8 shows a functional, schematic diagram of the loop link of the present invention. The electromagnetic transceiver drive coil 20 is excited with an alternating current, $I_C$, typically at a frequency with any desired RFID frequency band. The current $I_C$ is shown flowing out of the paper. A magnetic field is produced that circles the electromagnetic transceiver drive coil 20 and is shown by flux lines 48. Some of this magnetic field 48 is coupled by the highly permeable magnetic metal of the magnetic flux collector insert member 42 and is shown as flux lines 50, 52 and 54. The flux is coupled through the cross sectional area 46 of the upper first or primary loop 12, as shown in FIG. 7. This sinusoidal flux induces a current ($I_L$) in the aluminum pair of spaced apart electrically conductive connecting arms 14 formed by the first and second parallel spaced apart metal shafts, items 15, 16. The current $I_L$ flows down the pair of spaced apart electrically conductive connecting arms 14 to a smaller, lower second or secondary single metal loop 18, and returns via the pair of spaced apart electrically conductive connecting arms 14 to the larger upper first or primary single metal loop 12. In the smaller, lower second or secondary single metal loop 18, the sinusoidal current generates a magnetic field shown as flux line 56 that excites the tire pressure sensor 24 located in that field.

The physics involved is determined by Ampere's circuital law. The circulation of the magnetic field intensity around any closed path is equal to the free current flowing through the surface bounded by the path. The closed path is the pair of spaced apart electrically conductive connecting arms 14 formed by the parallel spaced apart metal shafts 15, 16 of aluminum. If a magnetic field is directed through the cross sectional area enclosed by the larger upper first or primary single metal loop 12, then a current is induced in the larger upper first or primary single metal loop 12. The flux is directed through the loop area by coupling along the surface of the permeable magnetic metal, item 42. The magnetic field can be coupled directly to the cross sectional area of the loop without the use of the permeable metal. However, the permeable magnetic metal increases the amount of flux that can be linked in the upper loop cross sectional area. The coupled flux travels on the surface of the permeable magnetic metal and exists at the bottom of the upper loop, shown as flux line 58.

In the upper loop, Ampere's circuital law applies to the current $I_L$ and the magnetic field coupled through the loop area (see FIG. 7, area 46). The magnetic field cuts through area 46 and induces a current in the upper first or primary single metal loop 12 enclosing the area 46 by the following equations:

$$\oint_C (\nabla \times H) \cdot ds = \int_S J \cdot dS$$

$$\oint_C (\nabla \times H) \cdot ds = I_L$$

The magnetic field H is the field perpendicular to the cross sectional area 46, shown in FIGS. 7 and 8. The integral of this magnetic field must be computed numerically because the H-field is not constant on the closed path that circles the current loop $I_L$. The equation is shown to give the general theory of operation of the loop link. This equation shows that the magnetic field link in the cross sectional area that the aluminum pair of spaced apart electrically conductive connecting arms 14 encircles produces a current $I_L$ in the pair of spaced apart electrically conductive connecting arms 14.

Electrical connections are not needed between the tire pressure sensor and the wheel hub coil. Hence, this uses a more reliable method to communicate with the tire pressure sensor. The simplicity of the design makes it much easier to produce. The design is also lower cost. The design can also be made strong by using thicker sheet metal so that it can withstand the harsh environment in the airplane wheel. The design is non-contact since the coupling device does not contact the wheel hub coil.

The loop link was successfully demonstrated on a 787 main wheel rim half in a Crane Aerospace & Electronics laboratory coupling between the 83-202-01 tire pressure sensor and the axle remote data concentrator 142-12922 at Lynnwood, Wash.

Referring to FIGS. 9-17, in a second embodiment, the method and system for coupling a magnetic field between a wheel hub coil and a tire pressure sensor coil of the present invention, without using unreliable electrical connections and wires that can easily break in the harsh environment of the airplane wheel. The aircraft tire pressure loop link 110 is typically formed as a large, rigid first or primary single metal loop 112, a rigid pair of spaced apart electrically conductive connecting arms 114, typically including parallel spaced apart metal shafts 115, 116, and a rigid second or secondary single metal loop 118. The parallel spaced apart metal shafts are preferably closely spaced apart by a small gap, to minimize their loop area.

Figure 11:
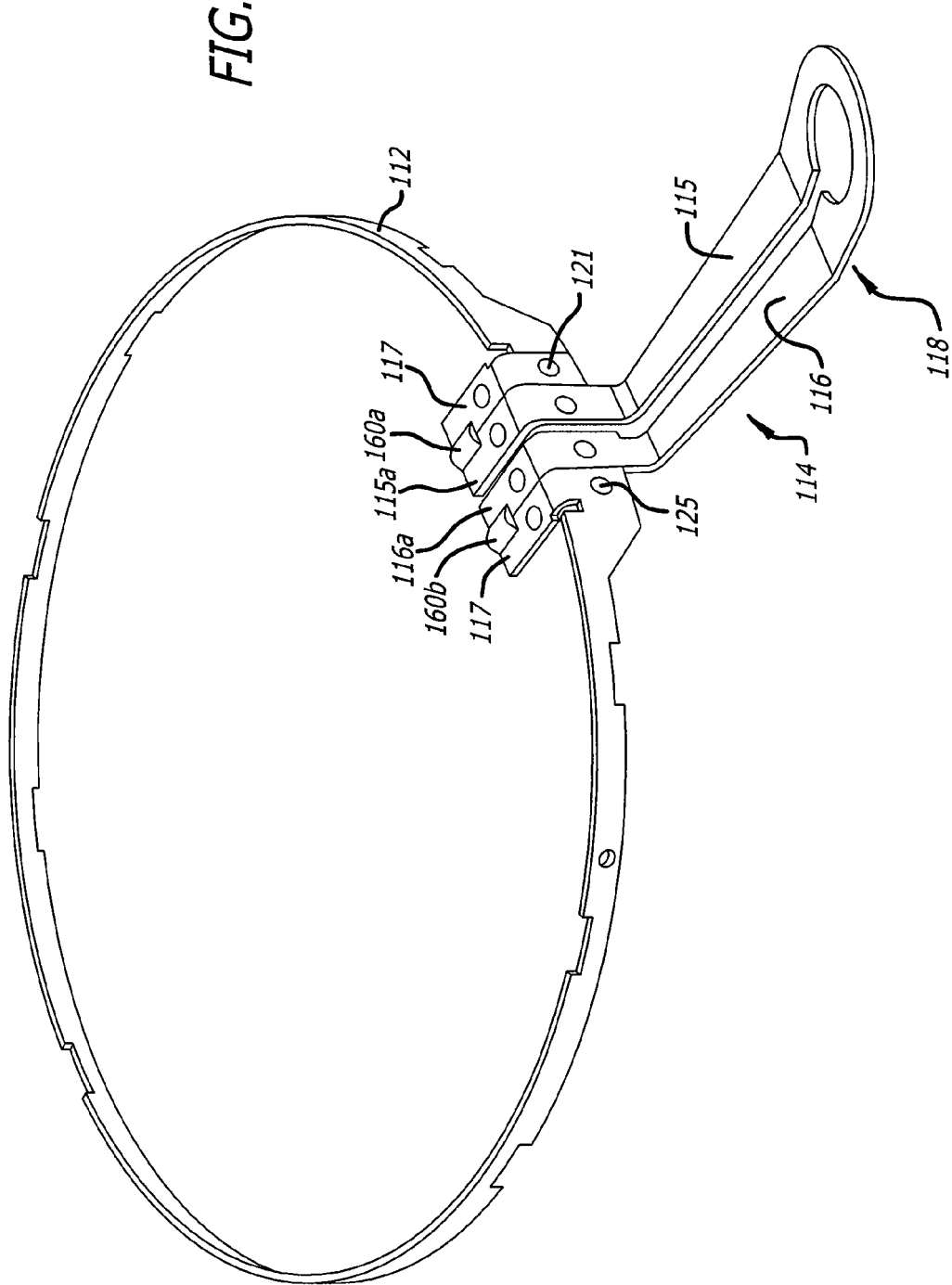
FIG. 11 is a perspective view of the aircraft tire pressure loop link similar to FIG. 9, omitting the carrier.
Figure 12:
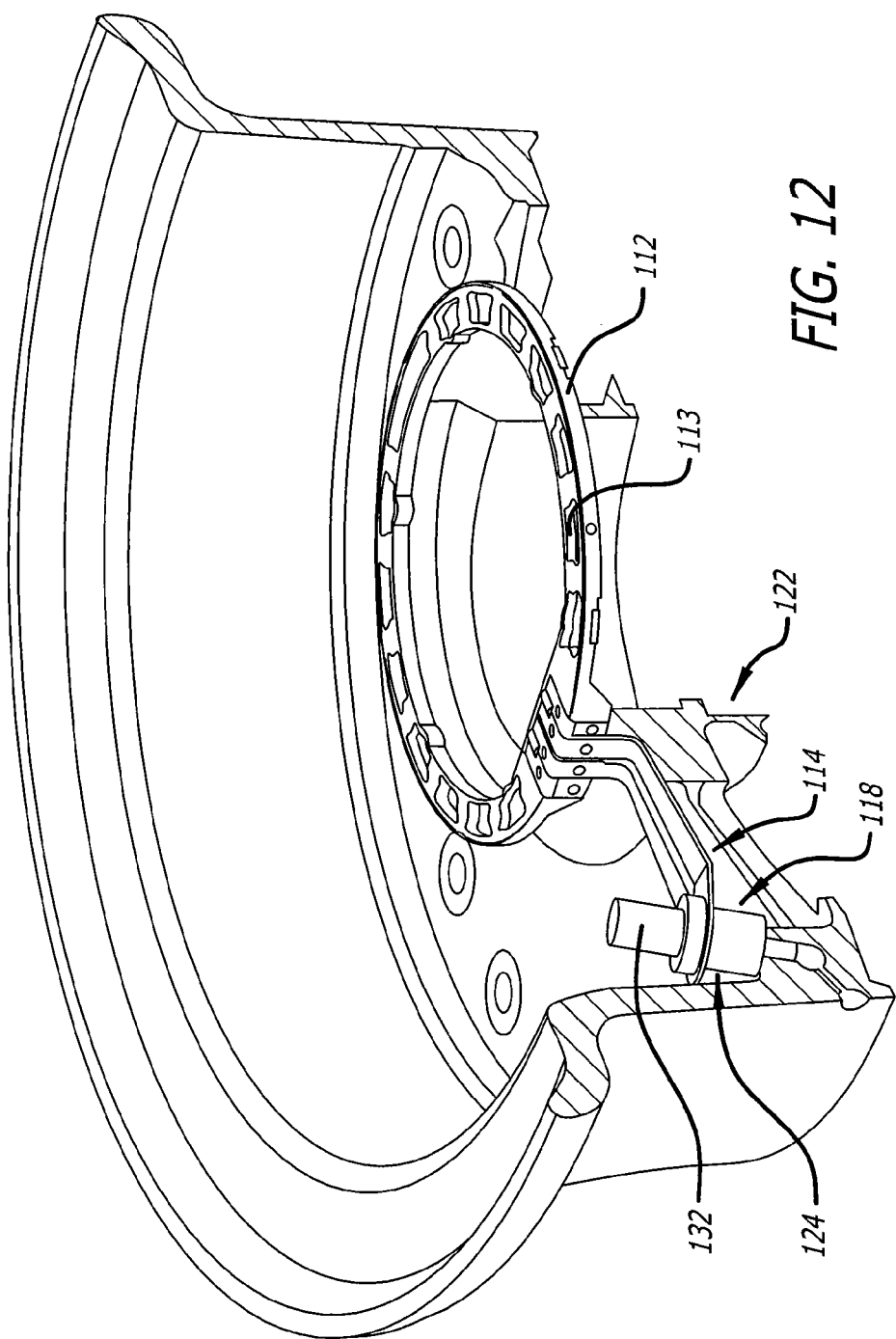
FIG. 12 is a perspective view illustrating the mounting of the aircraft tire pressure loop link of FIG. 9 in an aircraft wheel, electromagnetically connecting a wheel hub to a tire pressure sensor.
Figure 17:
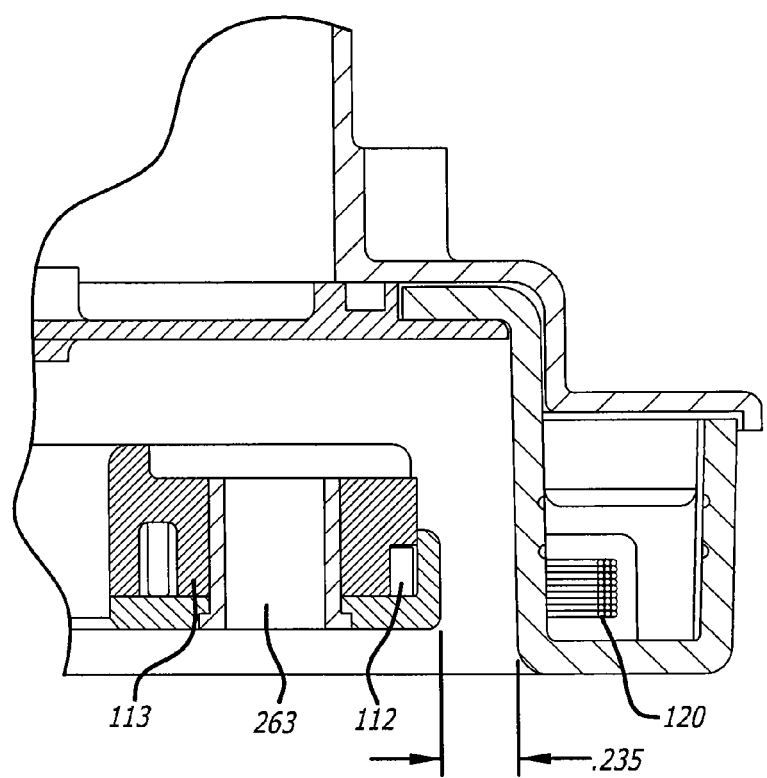
FIG. 17 is a functional, schematic diagram of the aircraft tire pressure loop link of FIG. 9 mounted in an aircraft wheel, additionally illustrating mounting of an axle mounted driver/reader coil.

The first or primary single metal loop is configured to be mounted adjacent to an electromagnetic transceiver drive coil 120, illustrated in FIG. 17, of a wheel axle 122 (shown in FIG. 12), and the second single metal loop is configured to be mounted adjacent to a tire pressure sensor transceiver coil 124 (shown in FIG. 12). As is illustrated in FIGS. 9-11, a carrier ring such as a molded plastic carrier ring 113 is configured to be mounted around and encircle the wheel axle 122 (as shown in FIG. 12), and the large, rigid first or primary single metal loop 112 can be attached around the molded plastic carrier ring 113 encircling the wheel axle, and can additionally be attached to the molded plastic carrier ring 113 by flanges or tabs 117 typically having apertures 119 for fasteners therethrough.

Figure 9:
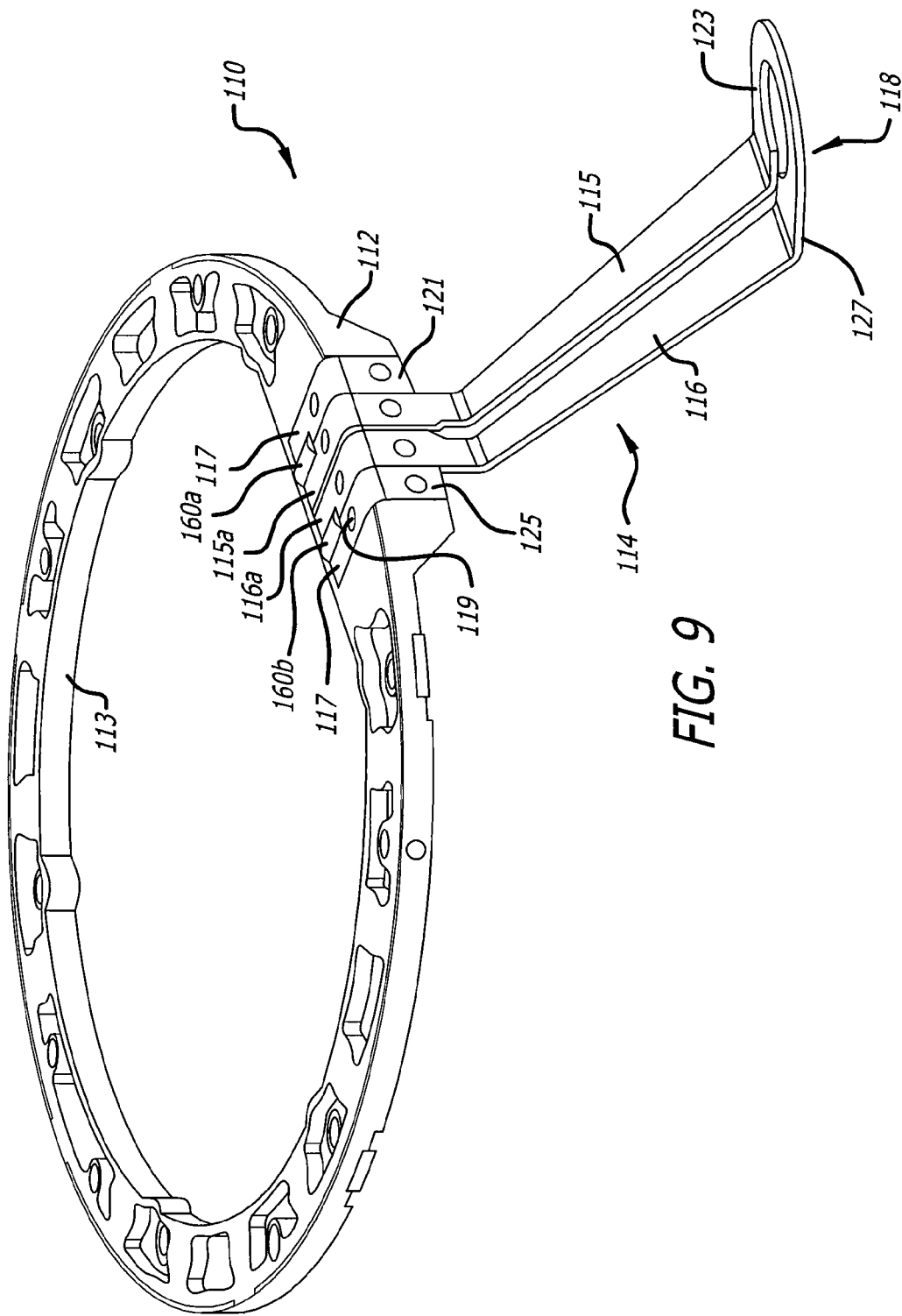
FIG. 9 is a perspective view of a second embodiment of an aircraft tire pressure loop link mounted on a carrier according to the invention.
Figure 10:
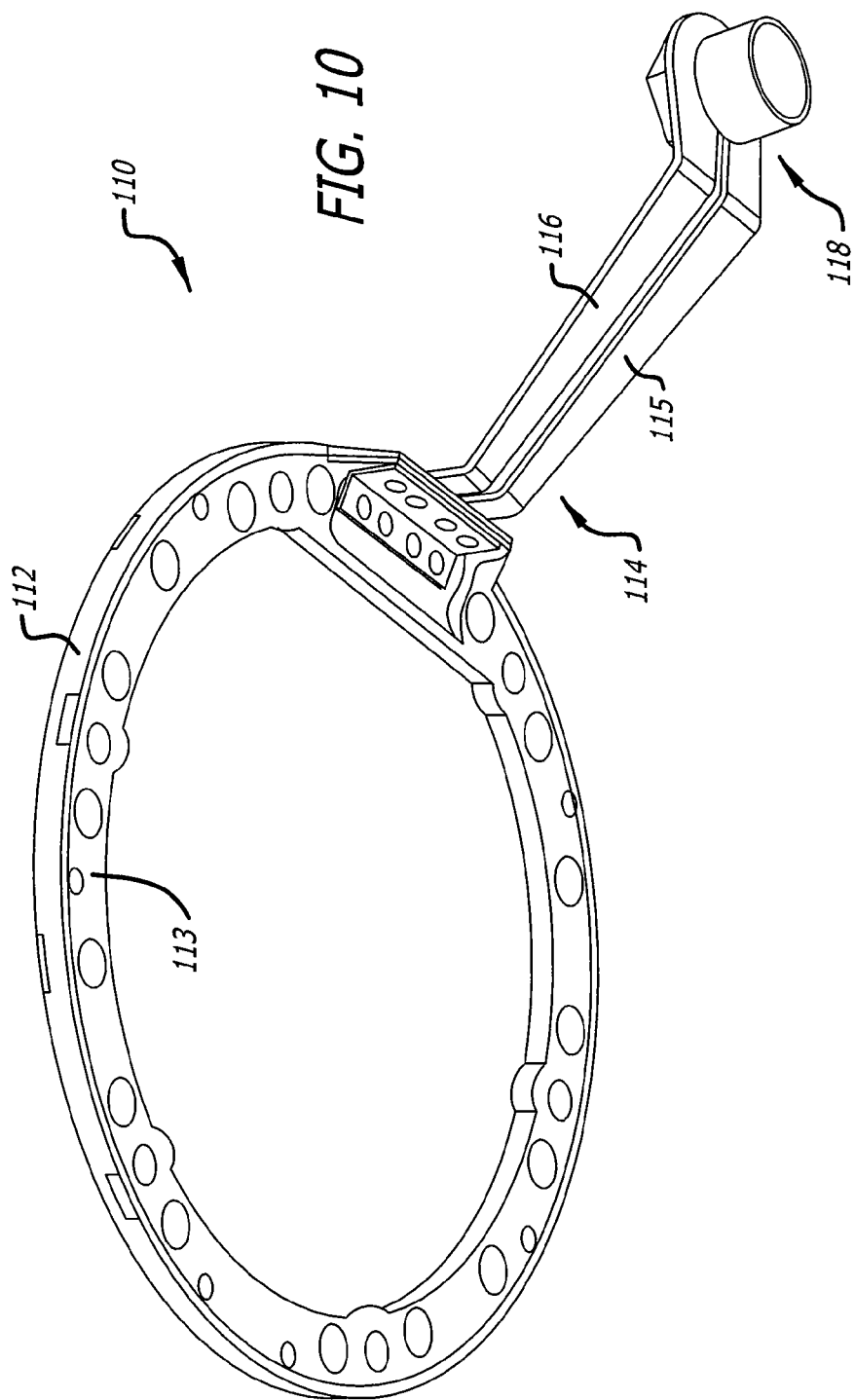
FIG. 10 is a bottom perspective view of the aircraft tire pressure loop link of FIG. 9.

As is illustrated in FIGS. 9-11, the pair of spaced apart electrically conductive connecting arms is rigidly connected to the molded plastic carrier ring 113, and is electrically connected between the first or primary single metal loop and the second or secondary single metal loop. The shaft 115 of the pair of spaced apart electrically conductive connecting arms is in this manner rigidly electrically connected at shaft portion 115a between a first portion 121 of the first or primary single metal loop, which can be formed as a flange or tab for connection to the carrier and for electrical connection to the shaft portion 115a via additional contact 160a, and a first portion 123 of the second or secondary single metal loop 118; and the shaft 116 is likewise rigidly electrically connected between a second portion 125 of the first or primary single metal loop, which can be formed as a flange or tab for connection to the carrier and for electrical connection to the shaft portion 116a via additional contact 160b, and a second portion 127 of the second or secondary single metal loop 118.

Referring to FIG. 12, the current induced in the first or primary single metal loop travels the distance from the edge of the wheel axle transceiver drive or reader coil to the periphery of the wheel rim to the second single metal loop, which generates the flux in the tire pressure sensor receiver coil necessary to power a tire pressure sensor 132. The aircraft tire pressure loop link of the invention can be made from a variety of metallic materials, such as low magnetically permeable metals, including aluminum or titanium, for example, that are readily available, and it is not necessary to use a highly magnetically permeable metal to couple flux over the needed distance. The pair of spaced apart electrically conductive connecting arms can be made of any desirable length without loss of coupling enhancement between a wheel axle electromagnetic transceiver drive coil and a tire pressure sensor transceiver coil. The flux is linked in one turn of a first or primary metal loop, and the current induced in the loop travels the distance from the edge of the wheel axle coil to the periphery of the of the wheel rim, where the second single loop of metal generates the flux in the tire pressure sensor receiver coil. The aircraft tire pressure loop link of the invention advantageously provides a low impedance electromagnetic signal path connection between a wheel axle electromagnetic transceiver drive or reader coil and a tire pressure sensor transceiver coil, so that no electrical insulation is required over the pair of connecting arms of the loop link. In addition, the aircraft tire pressure loop link of the invention advantageously provides a low voltage electromagnetic signal path connection between the wheel axle electromagnetic transceiver drive or reader coil and the tire pressure sensor transceiver coil, so that the loop link is not a source of electric field radiation and is not sensitive to electric field interference. The aircraft tire pressure loop link of the invention also advantageously can typically be an intrinsically rigid, self-supporting structural part, not requiring any additional means of support.

FIG. 17 shows a schematic sectional diagram of a portion of the loop link of the present invention. The electromagnetic transceiver drive or reader coil 120 is excited with an alternating current, $I_C$, typically at a frequency with any desired RFID frequency band. A magnetic field is produced that circles the electromagnetic transceiver drive or reader coil 120, and some of this magnetic field is coupled to the first or primary loop 112. This sinusoidal flux induces a current ($I_L$) in the aluminum pair of spaced apart electrically conductive connecting arms formed by the first and second parallel spaced apart metal shafts. The current $I_L$ flows down the pair of spaced apart electrically conductive connecting arms to the smaller, lower second or secondary single metal loop, and returns via the pair of spaced apart electrically conductive connecting arms to the larger upper first or primary single metal loop. In the smaller, lower second or secondary single metal loop, the sinusoidal current generates a magnetic field that excites a tire pressure sensor receiver coil necessary to power a tire pressure sensor.

Figure 13:
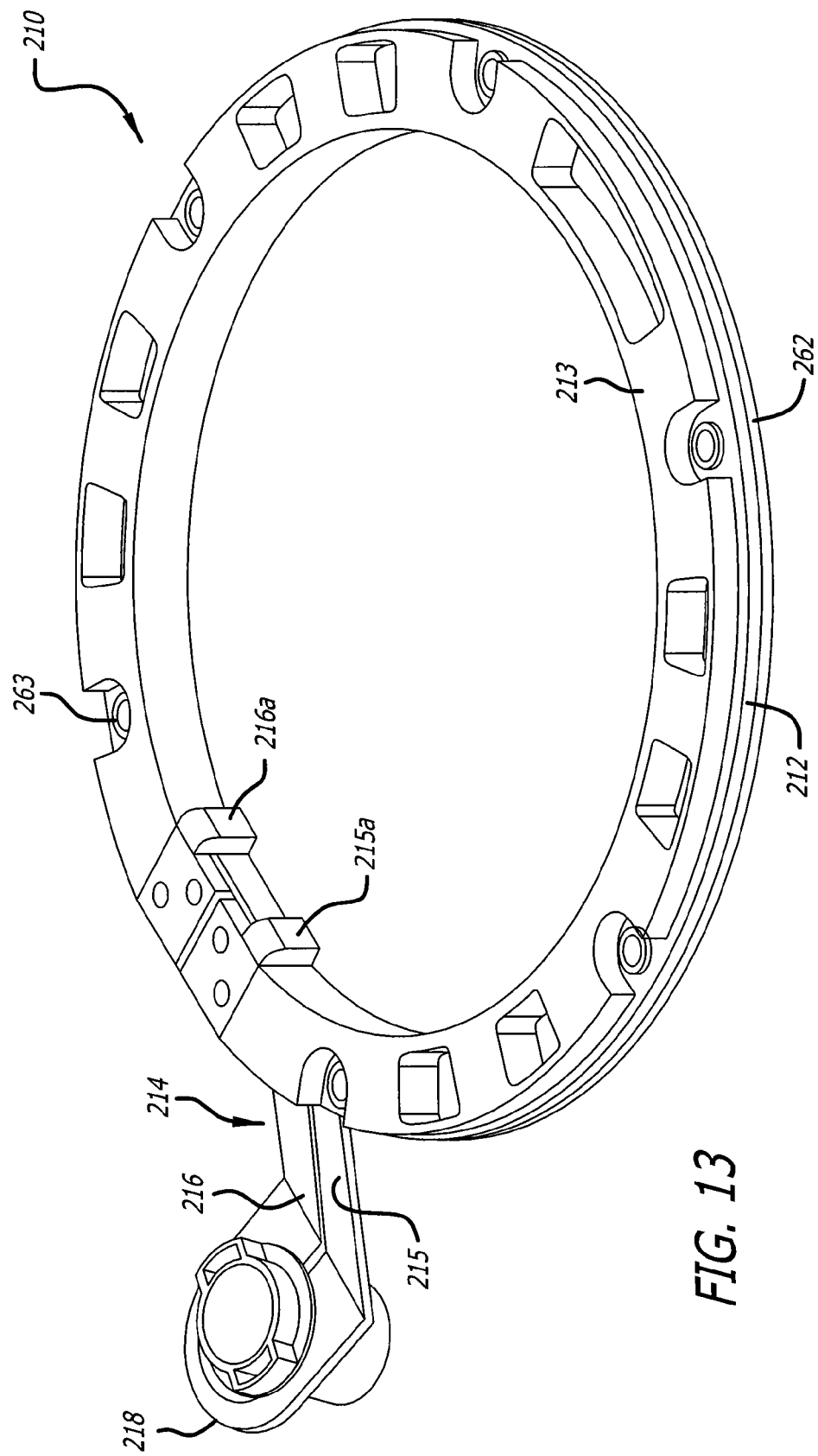
FIG. 13 is a perspective view of a first variation of the aircraft tire pressure loop link of FIG. 9.
Figure 14:
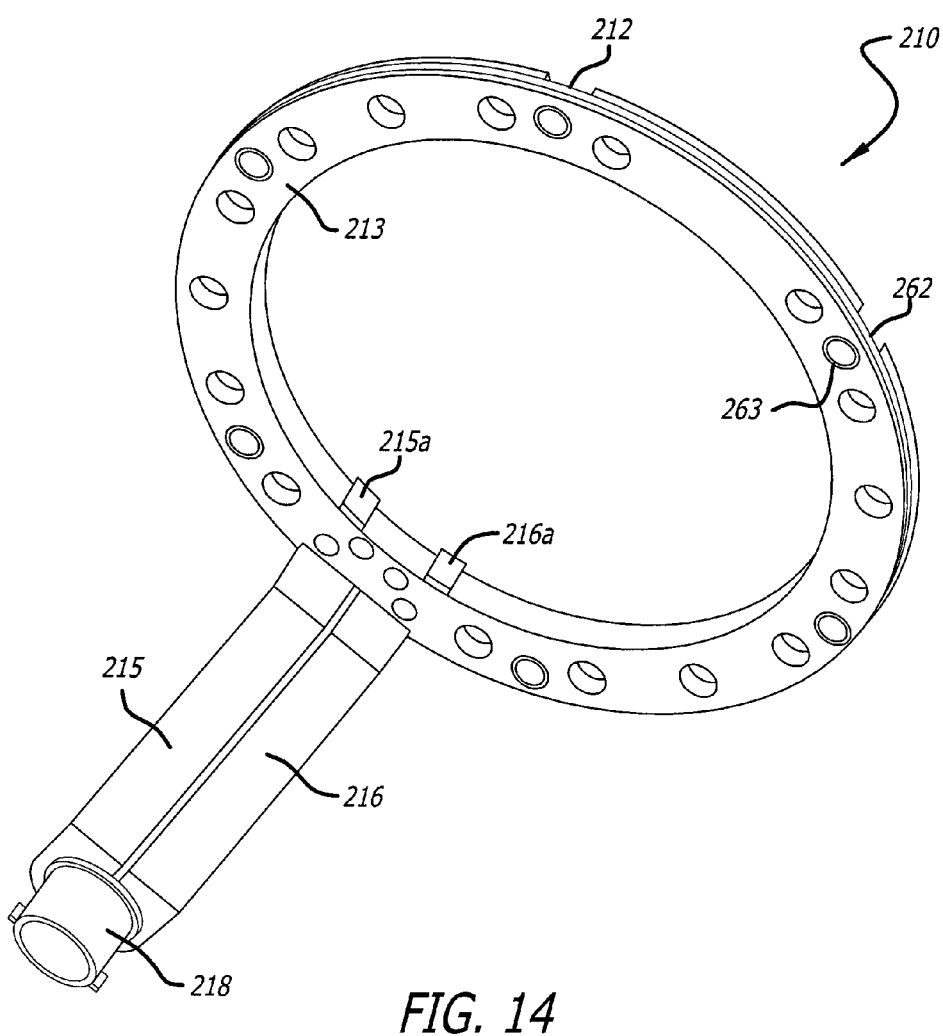
FIG. 14 is a bottom perspective view of variation of the aircraft tire pressure loop link of FIG. 13.

In a first variation of the second embodiment illustrated in FIGS. 13-14, the rigid pair of spaced apart electrically conductive connecting arms 214 including parallel spaced apart metal shafts 215, 216 of the aircraft tire pressure loop link 210 may alternatively be rigidly connected to an alternate form of the molded plastic carrier ring 213 having an external groove 262 configured to receive the rigid first or primary single metal loop 212, which can be adhesively bonded in the external groove, and a plurality of compression limiters 263 uniformly spaced around the carrier ring. The rigid pair of spaced apart electrically conductive connecting arms 214 is electrically connected between the first or primary single metal loop 212 and the second or secondary single metal loop 218. The shaft 215 includes a shaft portion 215a formed as a flange or tab which can be bent for connection to the molded plastic carrier ring, typically after spot welding electrical connection of the shaft 215 to a first portion of the first or primary single metal loop 212; and the shaft 216 likewise includes a shaft portion 216a formed as a flange or tab which can be bent for connection to the molded plastic carrier ring, typically after spot welding electrical connection of the shaft 216 to a second portion of the first or primary single metal loop 212.

Figure 15:
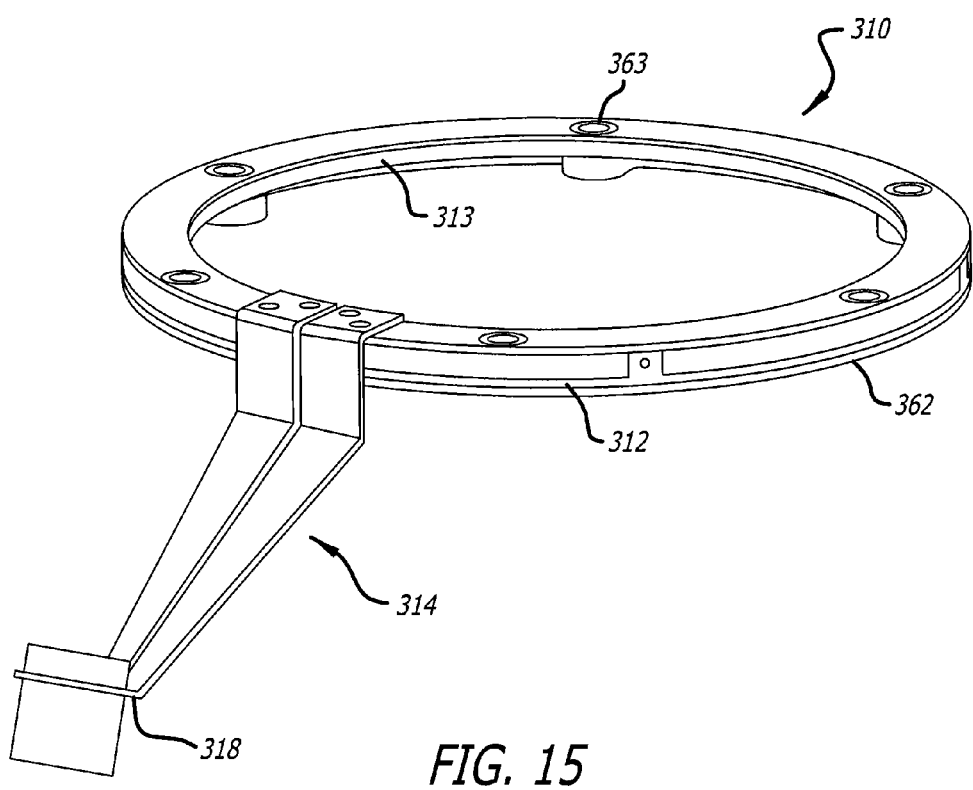
FIG. 15 is a perspective view of a second variation of the aircraft tire pressure loop link of FIG. 9, with an alternate form of the carrier, and illustrating vertical spot welding of electrical loop connections.

In another variation of the second embodiment illustrated in FIG. 15, the aircraft tire pressure loop link 310 may alternatively be rigidly connected to an alternate form of the molded plastic carrier ring 313 configured for vertical spot welding of the electrical loop connections, and having an external groove 362 configured to receive the rigid first or primary single metal loop 312.

Figure 16:
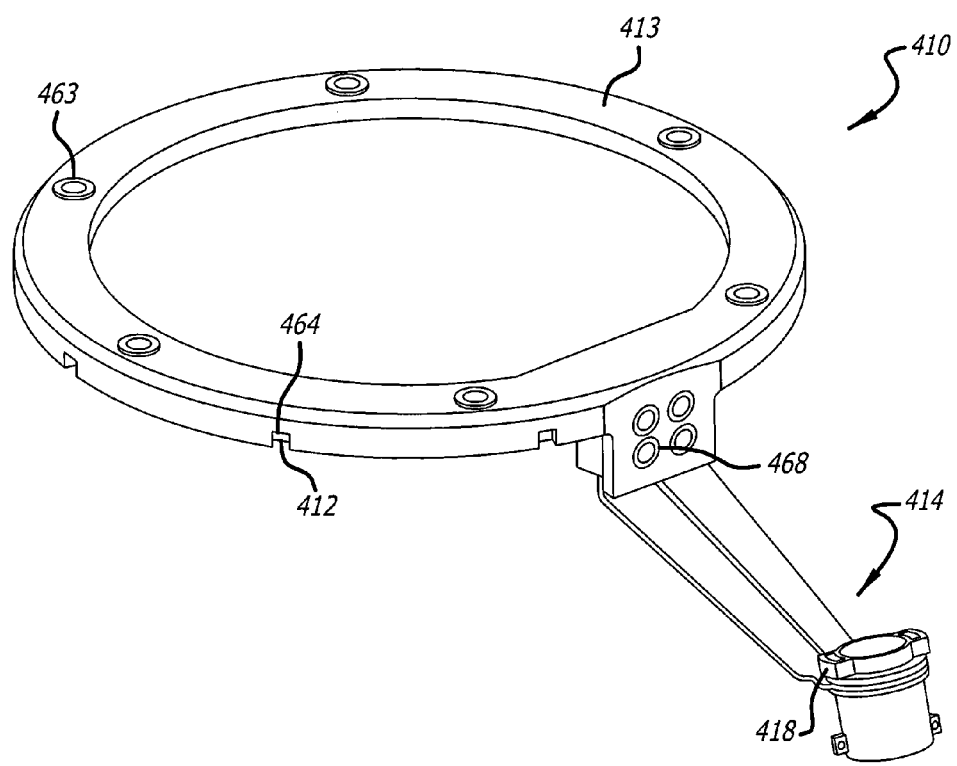
FIG. 16 is a perspective view of the variation of the aircraft tire pressure loop link of FIG. 15, illustrating horizontal spot welding of electrical loop connections.

In another variation of the second embodiment illustrated in FIG. 16, the aircraft tire pressure loop link 410 may alternatively be rigidly connected to an alternate form of the molded plastic carrier ring 413 configured for horizontal spot welding of the electrical loop connections, and the molded plastic carrier ring 413 may include positioning recesses 464 for positioning the first or primary single metal loop 412 internally within the carrier ring, and the rigid pair of spaced apart electrically conductive connecting arms 414 may be mounted to the carrier ring by a plate 466 including aluminum fasteners 468.

The second embodiment of the invention disclosed herein does not use a permeable metal to couple flux into the conductor loop that is located near the hub reader coil. Also, the second embodiment of the invention does not use multiple turn coils to link magnetic flux into the tire pressure sensor. The flux is instead linked into one larger turn (360 degrees) of a metal loop and the current induced in the loop travels the distance from the edge of the wheel axle coil to the periphery of the wheel rim. A second single loop of metal generates the flux in the tire pressure sensor receiver coil. Electrical connections are not needed between the tire pressure sensor and the wheel hub coil. Hence, this uses a more reliable method to communicate with the tire pressure sensor. The simplicity of the design makes it much easier to produce. The rigid primary and rigid secondary loops make the device structurally robust which is an advantage in the harsh wheel environment. In addition, a highly permeable metal is not needed to couple magnetic field into the primary rigid loop. The design is also lower cost. The design can also be made stronger by using thicker sheet metal so that it can withstand the harsh environment in the airplane wheel. The carrier material for the single inner loop can be fabricated with molded plastics, such as glass filled PEEK, for example. The design is non-contact since the coupling device does not contact the wheel hub coil. An added benefit of the invention is that the non-contact design enables a larger air gap, such as approximately 0.235" to 0.237" for example, between the primary rigid loop and the axle mounted RFID reader coil assembly. This feature eliminates foreign objects from damaging the internal assemblies.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. An aircraft tire pressure loop link for electromagnetically coupling a magnetic field between an electromagnetic transceiver coil of a wheel axle and a tire pressure sensor receiver coil spaced apart from the electromagnetic transceiver coil of the wheel axle for powering a tire pressure sensor, comprising:

a first single metal loop configured to be mounted on a carrier configured to encircle a wheel axle adjacent to the electromagnetic transceiver coil of the wheel axle;

a second single metal loop configured to be mounted adjacent to a tire pressure sensor transceiver coil; and a pair of electrically conductive connecting arms electrically connected between said first single metal loop and said second single metal loop, said pair of electrically conductive connecting arms being configured to carry current generated in the first single metal loop from the electromagnetic transceiver coil of the wheel axle to the second single metal loop, said pair of electrically conductive connecting arms being closely spaced apart by a small gap to minimize a loop area of said pair of electrically conductive connecting arms, such that current induced in the first single metal loop travels via the pair of spaced apart electrically conductive connecting arms a distance from the electromagnetic transceiver coil of the wheel axle to the second single metal loop, to generate flux in the tire pressure sensor receiver coil for powering the tire pressure sensor, wherein no wire connections are included in the aircraft tire pressure loop link to form an electrical circuit between the electromagnetic transceiver coil of the wheel axle and the tire pressure sensor receiver coil, and said aircraft tire pressure loop link is a rigid, self-supporting structural part.

2. The aircraft tire pressure loop link of claim 1, wherein said pair of spaced apart electrically conductive connecting arms can be of any desirable length without loss of coupling enhancement.

3. The aircraft tire pressure loop link of claim 1, wherein said aircraft tire pressure loop link provides a low impedance electromagnetic signal path connection between the wheel axle electromagnetic transceiver drive coil and the tire pressure sensor transceiver coil, whereby no electrical insulation is required over said pair of spaced apart electrically conductive connecting arms.

4. The aircraft tire pressure loop link of claim 1, wherein said aircraft tire pressure loop link provides a low voltage electromagnetic signal path connection between the wheel axle electromagnetic transceiver drive coil and the tire pressure sensor transceiver coil, whereby the aircraft tire pressure loop link is not a source of electric field radiation and is not sensitive to electric field interference.

5. The aircraft tire pressure loop link of claim 1, wherein said aircraft tire pressure loop link comprises a rigid, self-supporting structural part.

6. The aircraft tire pressure loop link of claim 1, wherein said carrier comprises a molded plastic carrier ring.

7. An aircraft tire pressure loop link for electromagnetically coupling a magnetic field between an electromagnetic transceiver coil of a wheel axle and a tire pressure sensor receiver coil spaced apart from the electromagnetic transceiver coil of the wheel axle for powering a tire pressure sensor, comprising:

a first single metal loop configured to be mounted on a carrier ring configured to encircle a wheel axle adjacent to the electromagnetic transceiver coil of the wheel axle;

a second single metal loop configured to be mounted adjacent to a tire pressure sensor transceiver coil; and a pair of spaced apart electrically conductive connecting arms electrically connected between said first single metal loop and said second single metal loop, said pair of spaced apart electrically conductive connecting arms being configured to carry current generated in the first single metal loop from the electromagnetic transceiver coil of the wheel axle to the second single metal loop, such that current induced in the first single metal loop travels via the pair of spaced apart electrically conductive connecting arms a distance from the electromagnetic transceiver coil of the wheel axle to the second single metal loop, to generate flux in the tire pressure sensor receiver coil for powering the tire pressure sensor.

8. The aircraft tire pressure loop link of claim 7, wherein said first single metal loop is formed of a metal having low magnetic permeability.

9. The aircraft tire pressure loop link of claim 7, wherein said carrier comprises a molded plastic carrier ring.

10. The aircraft tire pressure loop link of claim 7, wherein said pair of spaced apart electrically conductive connecting arms comprises first and second parallel spaced apart metal shafts connected between said first single metal loop and said second single metal loop.

11. The aircraft tire pressure loop link of claim 10, wherein said first and second parallel spaced apart metal shafts comprise aluminum.

12. An aircraft tire pressure loop link for electromagnetically coupling a magnetic field between an electromagnetic transceiver coil of a wheel axle and a tire pressure sensor receiver coil spaced apart from the electromagnetic transceiver coil of the wheel axle for powering a tire pressure sensor, comprising:
   an electromagnetic transceiver coil of the wheel axle;
   a primary single metal loop configured to be mounted on a carrier ring configured to encircle the wheel axle adjacent to the electromagnetic transceiver coil of the wheel axle, said primary single metal loop including a magnetic flux collector insert member electrically connected and attached to said primary single metal loop for collecting an impinging magnetic flux from the electromagnetic transceiver coil of the wheel axle;
   a secondary single metal loop configured to be mounted adjacent to a tire pressure sensor transceiver coil; and
   a pair of spaced apart electrically conductive connecting arms electrically connected between said primary single metal loop and said secondary single metal loop, said pair of spaced apart electrically conductive connecting arms being configured to carry current generated in the primary single metal loop from the electromagnetic transceiver coil of the wheel axle to the secondary single metal loop, such that current induced in the primary single metal loop travels via the pair of spaced apart electrically conductive connecting arms a distance from the electromagnetic transceiver coil of the wheel axle to the secondary single metal loop, to generate flux in the tire pressure sensor receiver coil for powering the tire pressure sensor.

13. The aircraft tire pressure loop link of claim 12, wherein said first single metal loop is formed of a metal having low magnetic permeability.

14. The aircraft tire pressure loop link of claim 12, wherein said carrier ring comprises a molded plastic carrier ring.

15. The aircraft tire pressure loop link of claim 12, wherein said pair of spaced apart electrically conductive connecting arms comprises first and second parallel spaced apart metal shafts connected between said primary single metal loop and said secondary single metal loop.

16. The aircraft tire pressure loop link of claim 15, wherein said first and second parallel spaced apart metal shafts comprises aluminum.

17. The aircraft tire pressure loop link of claim 12, wherein said pair of spaced apart electrically conductive connecting arms can be of any desirable length without loss of coupling enhancement.

18. The aircraft tire pressure loop link of claim 12, wherein said aircraft tire pressure loop link provides a low impedance electromagnetic signal path connection between the wheel axle electromagnetic transceiver drive coil and the tire pressure sensor transceiver coil, whereby no electrical insulation is required over said pair of spaced apart electrically conductive connecting arms.

19. The aircraft tire pressure loop link of claim 12, wherein said aircraft tire pressure loop link provides a low voltage electromagnetic signal path connection between the wheel axle electromagnetic transceiver drive coil and the tire pressure sensor transceiver coil, whereby the aircraft tire pressure loop link is not a source of electric field radiation and is not sensitive to electric field interference.

* * * * *